No. 837,587. PATENTED DEC. 4, 1906.
E. T. SHELTON.
STUMP EXTRACTOR.
APPLICATION FILED JAN. 27, 1906.
4 SHEETS—SHEET 2.
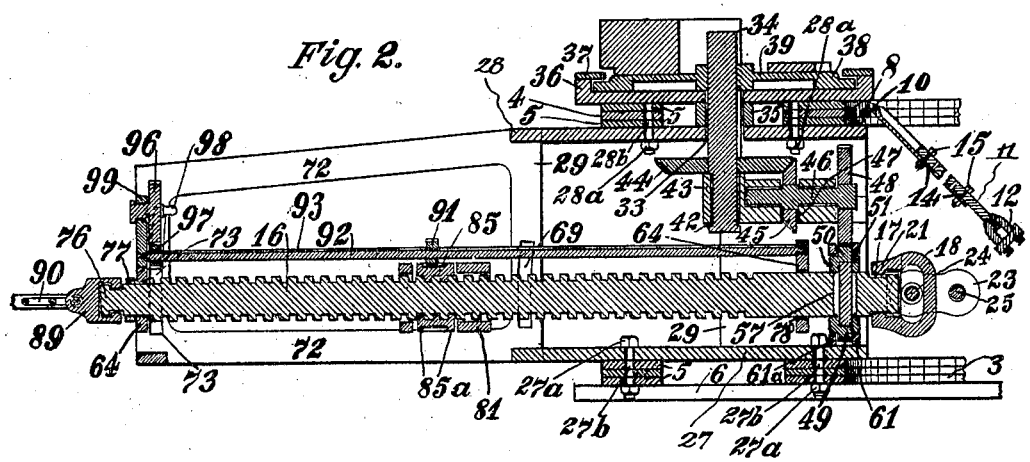
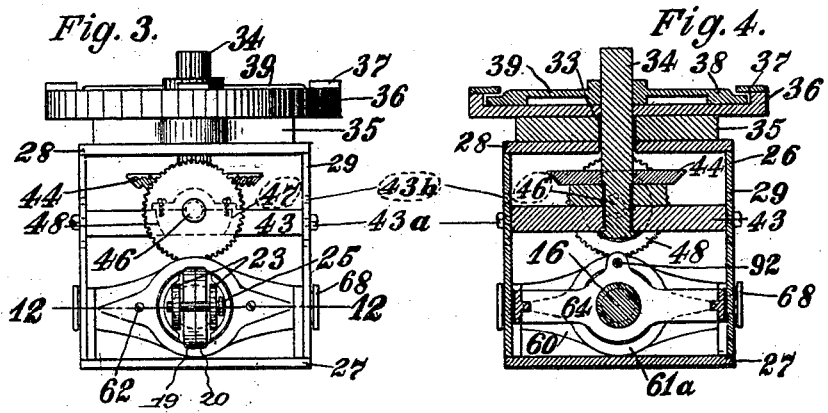
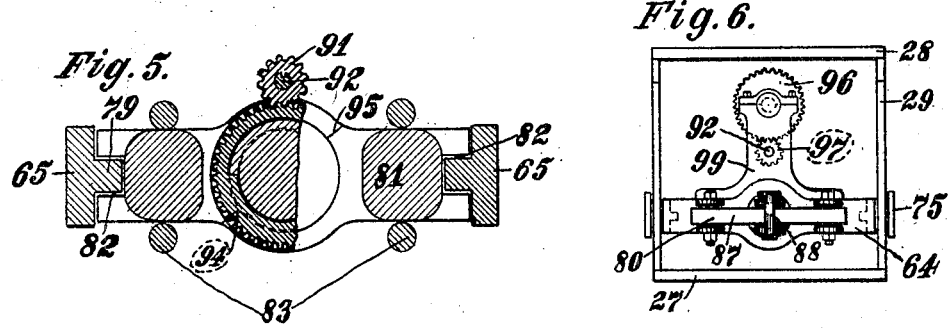
Witnesses:
Geo. G. Anderson.
Gladys Walton.
Inventor:
Edwin T. Shelton,
By Hugh K. Wagner,
His Attorney.

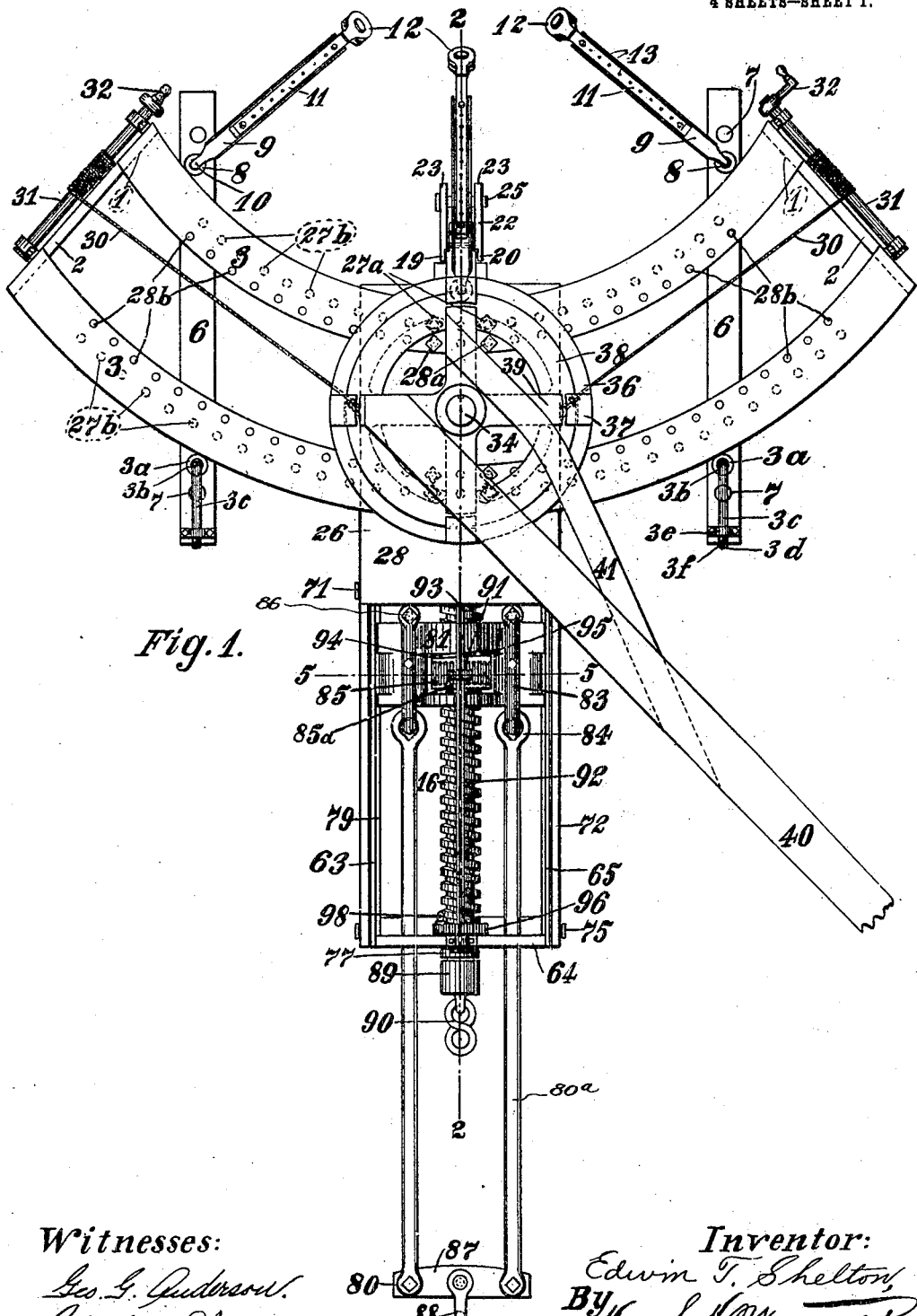

No. 837,587. PATENTED DEC. 4, 1906.
E. T. SHELTON.
STUMP EXTRACTOR.
APPLICATION FILED JAN. 27, 1906.
4 SHEETS—SHEET 3.
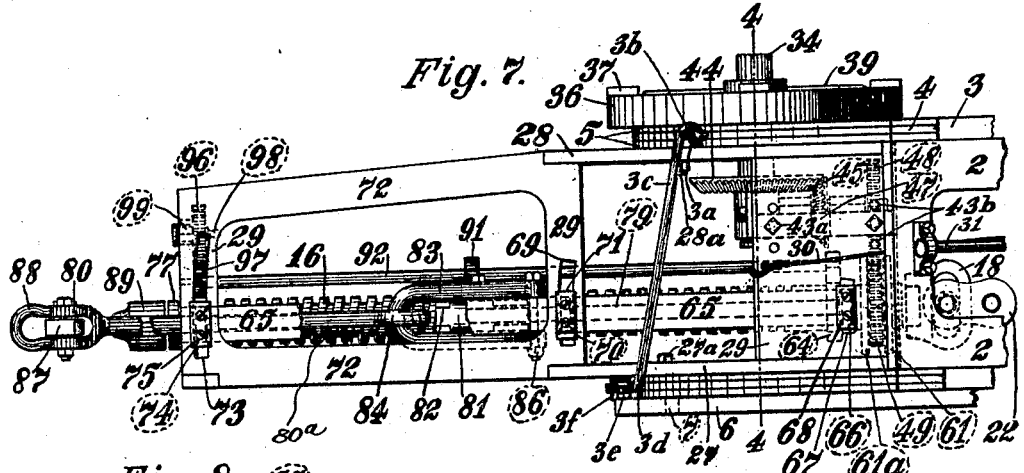
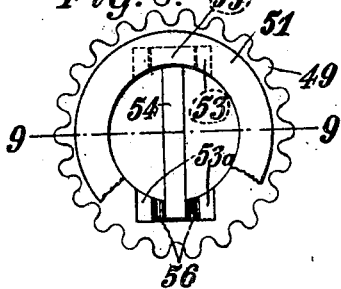
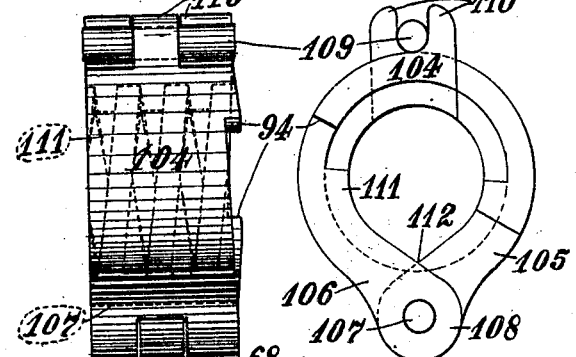
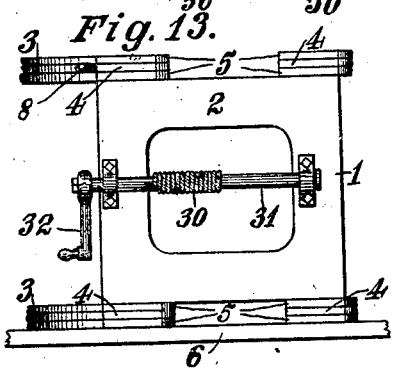
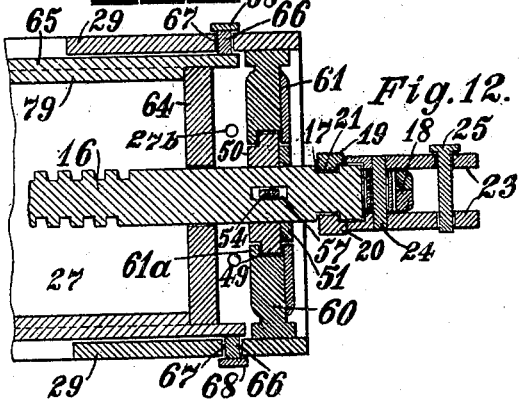
Witnesses:
Geo. G. Anderson
Gladys Walton
Inventor:
Edwin T. Shelton,
By Hugh K. Wagner
His Attorney.

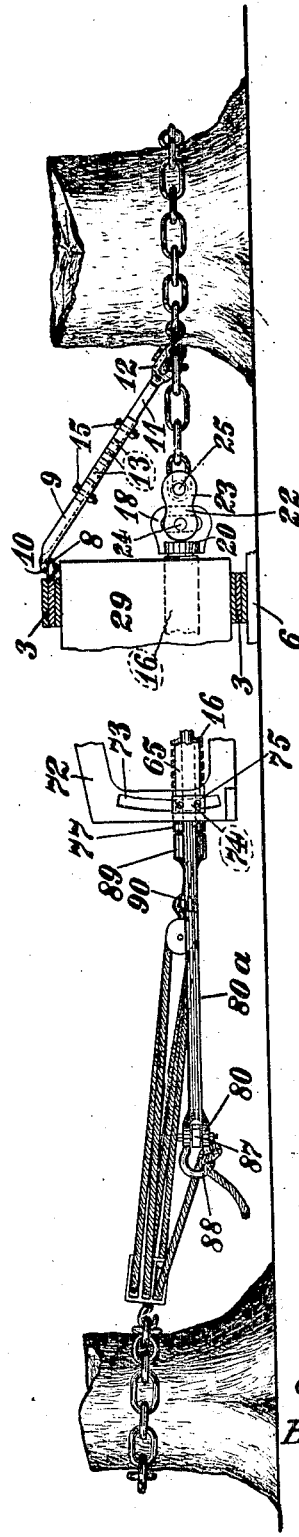

UNITED STATES PATENT OFFICE.

EDWIN T. SHELTON, OF ST. LOUIS, MISSOURI.

STUMP-EXTRACTOR.

No. 837,587.

Specification of Letters Patent.

Patented Dec. 4, 1906.

Application filed January 27, 1906. Serial No. 298,092.

*To all whom it may concern:*

Be it known that I, EDWIN T. SHELTON, a citizen of the United States, residing at the city of St. Louis, State of Missouri, have invented certain new and useful Improvements in Stump-Extractors, of which the following is a specification, reference being had therein to the accompanying drawings.

My invention relates to stump-extractors, and has for its object to produce a structure unusually compact and strong and capable of exercising the greatest tensile force upon the stump to be drawn; and it consists also in the combination of a plurality of mechanical powers operating from a single shaft.

In the drawings accompanying this specification and forming part of same, in which like numbers of reference denote like parts wherever they occur, Figure 1 is a top plan view. Fig. 2 is a sectional view on line 2 2, Fig. 1. Fig. 3 is a rear elevation of the box and some connected parts. Fig. 4 is a sectional view on line 4 4, Fig. 7. Fig. 5 is a sectional view on line 5 5, Fig. 1. Fig. 6 is a front elevation of the box and some connected parts. Fig. 7 is a side elevation of the same. Fig. 8 is a detail of the gear-wheel which actuates the lead-screw, parts being broken away. Fig. 9 is a sectional view of the same on line 9 9, Fig. 8. Figs. 10 and 11 illustrate a modification of the device for clutching the lead-screw. Fig. 12 is a sectional view of the rearward parts, taken on the line 12 12, Fig. 3. Fig. 13 is an end view of the main frame looking from the left in Fig. 1; and Fig. 14 is a side elevation with the middle part of the machine broken away, showing the connecting means between the machine and the stump to be extracted and also part of the anchoring devices.

The main frame consists of a plurality of upright standards 1 and horizontal cross-pieces 2, and a plurality of upper and a plurality of lower segmental members 3. Each of these members 3 is composed of a layer of wood 4 between two layers of metal 5, thus combining strength and lightness, the three layers being rigidly united together. Heavy sleepers 6 are provided, on which the lower pair of segmental members 3 are firmly fixed. These sleepers 6 rest upon the ground and are suitably fastened thereto, as by stakes (not shown) driven through perforations 7 in the sleepers 6 and adjacent to the sides and ends thereof, so that when the sleepers are suitably fixed to the ground the whole machine will be held stationary in any desired position.

In order to provide additional means for anchoring the machine, however, eyes 8 are fixed to any convenient portion of the main frame, as the rear upper segment 3. A channel-iron 9, having a hook 10 at one end, formed integral therewith, can be attached to the main frame by inserting the hook 10 into one of the eyes 8. A bar or rod 11 of such dimensions as to slide easily in the channel-iron 9, has at one end a suitable swiveled clevis 12, to which a chain may be fastened, said chain being passed around any neighboring stump or tree, or a spike may be driven through said clevis and into the anchor tree or stump. This bar is perforated at a plurality of places 13, and a plurality of perforations 14 are formed in the channel-iron. Bolts 15 pass through the perforations 13 and 14 to fix the bar 11 and channel-iron 9 together. As said bolts are removable, these two members may be attached only near their adjoining ends or throughout most of their length, thus allowing the bar 11 to be fixed adjustably in the channel-iron 9, the relative adjustment depending on circumstances, such as the length of the chain, the distance of the anchoring-stump, the degree of strength needed in the anchor, &c.

A short distance from the end of the lead-screw 16 is an annular groove 17. A yoke 18, consisting of two pieces 19 and 20, bolted or clamped together, fits over the end of the lead-screw 16, and a shoulder 21 on the yoke fits in the groove 17. The rotation of the lead-screw 16 will not turn the yoke 18; but as the yoke 18 cannot slip off the lead-screw 16 when the yoke is firmly fastened to the anchoring-stump the lead-screw 16 also is firmly fastened to the anchoring-stump. A link 22, consisting of two flat plates 23, cross-connected by pins 24 and 25, is arranged with pin 24 passing through the yoke 18, while upon pin 25 is pivoted the end of a hook which passes through the end link of a chain which extends to any anchoring stump or tree. For said link and hook may be substituted a clevis in the shape of a figure 8. (Not shown.) Thus it will be seen that the machine is held in place not only by the stakes driven through and around the sleepers 6, but also by the extension-braces terminating in clevises 12 and fastened to the anchoring-stump and to the rear upper segmental member 3 and also by the suitably-anchored chain connected to the lead-screw 16 by means of the link 22 and yoke 18.

The moving parts by which the extraction of the stump is accomplished are all mounted in or in connection with a supplemental frame or box 26, which box is composed of a base 27, a top 28, and suitable uprights 29 to provide bearings and supports where necessary. This box 26 fits in between the top and bottom pairs of segmental members 3 and can be shifted from one end of the frame to the other when desired by means of the pair of wire cables 30, adapted to be wound and unwound alternately on shafts 31, operated by crank-handles 32, either the one or the other being used, according to the direction in which it is desired to move the box, so that the pull will be exerted in the line of a straight angle from the anchorage and so that without moving the main frame from its original anchorage all stumps within the radius allowed by the scope of the segments 3 may be extracted.

In order to hold the front upper segment 3 from yielding upwardly under strain, I attach thereto eyes 3$^a$, into which hooks 3$^b$ on rods 3$^c$ enter, the other end of each of said rods terminating in a foot 3$^d$, fitting through an opening in the anchoring-plate 3$^e$ and having a perforation through said foot, through which a split pin 3$^f$ or other key passes.

Bolts 27$^a$ pass through the bottom 27 of the box 26 and lower pair of segmental members 3 and bind the box thereto, like bolts 28$^a$ passing through the top 28 of box 26 and the upper pair of segmental members 3 for a like purpose, bolt-holes 27$^b$ and 28$^b$, respectively, being provided for the passage of said bolts.

In the top plate 28 of the box is a perforation 33, through which the main shaft 34 is passed. This shaft projects out and beyond the main frame and is located in the slot formed between the upper segmental members 3. A sleeve or collar 35 is formed integral with the top plate 28 of the box 26, and this collar also projects through the slot between the segmental members 3 and slightly beyond them. A circular plate 36 is bolted to this collar outside the segmental members 3, and lugs or guides 37, attached thereto, form a means for guiding the revolution of the wheel 38, which is keyed to the shaft 34 and slidingly rotates on plate 36. To the spokes 39 of wheel 38 is fastened a long sweep-arm 40, to the outer end of which a team of horses can be hitched, and as they travel around in a circle they cause the arm 40 to revolve and actuate the wheel 38, and with it the shaft 34. A brace 41 also helps to bind sweep-arm 40 to wheel 38. This shaft 34 has one of its bearings in the perforation 33, which pierces both the top plate 28 and the collar 35, and the other in a perforation 42 in or through the cross-piece or plate 43, which is supported by the sides 29 of the box 26 by means of set-screws 43$^a$, passing through perforations 43$^b$ in the sides 29 and into plate 43. On the end of shaft 34 inside the box 26 is keyed a beveled pinion 44, which meshes with and drives a beveled gear 45, keyed to a shaft 46, which is carried in a recess 47 in plate 43. Obviously it may prove desirable to substitute for gears 45 a gear either larger or smaller, according to the necessity for either greater speed or power, and for this reason the plate 43 is made adjustable vertically by means of the screws 43$^a$ and openings 43$^b$. At the opposite end of this shaft 46 is keyed a gear-wheel 48, which meshes with and drives a gear-wheel 49, mounted on the lead-screw 16. While this gear-wheel 49 might be fixedly keyed to the lead-screw 16, I have found it expedient to attach same in a manner to admit of considerable play.

The opening through the hub of the gear-wheel 49 is of such diameter that it loosely, and not too snugly, fits over the lead-screw 16. On the forward side of the gear-wheel 49 a shoulder 50 is formed integral therewith, and on the opposite side thereof a collar 51 is bolted or fastened thereto, which collar also encircles the lead-screw 16. In the part of gear-wheel 49 immediately surrounding lead-screw 16, and at diametrically opposite points, recesses 53 are formed. From the forward side of each of these recesses project a pair of shoulders 53$^a$, the parts thereof which face each other being concaved to receive in one of said recesses the cylindrical head 55 of a pin 54, which passes through slot 57 through lead-screw 16, thus to hold the gear 49 in fixed longitudinal relation to lead-screw 16. The pin 54 has a body rectangular in cross-section, the corners thereof at the end opposite the head 55 being rounded. When put into place, the forward half of said cylindrical head 55 rests in the semicircular cavity formed by the concave faces of shoulders 53$^a$ and is retained therein by the concaved boss 51$^a$, borne by collar 51.

Cotters 56 fit between the end of pin 54, that has rounded corners, and the concaved faces of shoulders 53$^a$, projecting somewhat thereabove and into the semicircular cavity in boss 52. This arrangement makes this end of pin 54 practically cylindrical, like the head 55, both ends being provided with a bearing circular in form, and thus allowing pin 54 to rock as far to one side or the other as is permitted by the walls of slot 57 in lead-screw 16, said slot not closely confining the movement of said pin. The gear-wheel 49 is first slipped on the screw 16, and then the pin 54 is passed through slot 57, its ends resting in recesses 53. The cotters 56 are then put in place. Then the collar 51 is screwed to the gear 49. Thus, it will be seen, the rotation of the gear-wheel 49 will produce revolution of the lead-screw; but at the same time considerable play in the parts is allowed, which I have found is a very desirable element, this key for lead-screw 16 yielding as said screw rises or falls or moves from side to side.

To the rear uprights 29 of the box 26 the collar 60, formed of two pieces, is fixed. The opening through this collar 60 is large enough in diameter to encircle the gear-wheel 49, but not to touch its teeth, being open at the top, so that the gear-wheel 49 can project out and mesh with the pinion 48. On the inner side of this collar 60 is a collar of smaller diameter, 61$^a$, same being formed integral therewith, and collar 61 being attached thereto by screws 62 or other suitable means. The collar 61$^a$ is of just the right size to receive and encircle the shoulder 50, fixed to the gear-wheel 49, and these several collars hold gear 49 in place, so that it meshes properly at all times with gear 48.

The method of mounting the parts is as follows: The collar 60 being in position, the gear-wheel 49 is then slipped over the lead-screw 16, so that collar 60 fits over the gear-wheel 49. The pin 54 is properly fitted into the recesses 53 of gear-wheel 49 and through the slot 57 in the lead-screw 16, as hereinbefore described. The cotters 56 are put in place, collar 51 is screwed to gear 49, and, finally, collar 61 is slipped over collar 51.

The lead-screw 16 is journaled in a rectangular frame 63, composed of cross-pieces 64 and longitudinal members 65. On the rear end of these members 65 are provided studs 66, which project through short arcuate slots 67, cut in the rear uprights 29 of the box 26. A cap 68 is secured to each of these studs 67 outside of the uprights 29. The frame 63 is thus allowed a little vertical play at its rear end, as the studs 66 can work up and down in slot 67. In the forward uprights 29 of the box 26 similar but longer arcuate slots 69 are cut. Studs 70, having caps 71 secured to their outer ends, fastened about the middle of the longitudinal members 65, pass through these slots 69, and thus the forward end of the rectangular frame 63 is allowed a great deal more vertical play than its end rear. Projecting from the forward end of box 26 is a pair of extension-frames 72, the forward uprights of which are slotted at 73, and studs 74 and caps 75, similar to the studs 66 and 70 and caps 67 and 71, work in slot 73 and guide the extreme forward end of frame 63.

The forward end of the lead-screw 16 is reduced in diameter, forming a shoulder 76, the reduced portion being journaled in a bearing formed in the front cross-piece 64 of the rectangular frame 63. A ring 77, fitting over the reduced portion and the shoulder 77, fit on opposite sides of cross-piece 64, and thus, while the lead-screw 16 can turn freely in its said bearing, it is held in fixed longitudinal relation to the rectangular frame 63. The opening 78 through the rear cross-piece 64 permits of the passage therethrough of the lead-screw 16.

On the inside of the longitudinal members 65 ribs or cleats 79 form slideways, on which the block 81 travels, carrying with it yoke 80, said yoke consisting of two longitudinal arms 80$^a$, connected at the forward end by the cross-piece 87. The lead-screw 16 passes through a horizontal opening through block 81, and in a vertical opening therethrough is located an internally-threaded collar 85, which encircles the lead-screw. Suitable grooves 82 are provided in the sides of block 81 to fit over the ribs 79 in order that the block 81 may slide thereon.

The yoke 80 is attached to block 81 by means of loops 83, passing through clevises 84 in the ends of the arms 80$^a$ of yoke 80, each of said loops 83 encircling the block 81 on three sides and being held tightly in such encircling contact by bolts 86, which pass through perforations in the ends of the arms of said loops. The yoke 80 passes through openings in the cross-piece 64, and to its cross-piece 87 is attached a clevis 88, to which the stump-pulling chain or cable is fastened. At the extreme front end of the lead-screw 16 is a swivel-joint 89, having a clevis 90 attached thereto, which clevis will not turn as the lead-screw rotates because of said swivel-joint.

As the collar 85 is internally threaded it travels from front to rear of the machine when the lead-screw is rotated, thus necessarily pulling with it block 81, yoke 80, and chain attached to clevis 88. The pull thus exerted extracts the stump to which said chain is hitched. When desired, chains or ropes may be passed around the stump to be extracted and through the clevis 90, by which means one end of a block-and-tackle arrangement is anchored to the lead-screw 16. As yoke 80 is retracted from the stump to be extracted it pulls the loose end of the rope of the pulley device and by reason of the mechanical power of the pulley multiplies the pull of the yoke 80 between it and the stump, thus aiding the direct pull of the yoke 80, as hereinbefore described.

The collar 85 rotates on lead-screw 16 until the shoulder 94 strikes upon the stop 95, borne by the block 81, thus locking the collar 85 from further rotation and causing the beginning of rearward travel of same and of yoke 80 and connected parts. At this position it is necessary that collar 85 be returned to the forward part of the machine in order to take another hitch. This is accomplished through the instrumentality of the externally-toothed roller 91, splined upon the rod 92, which contains a longitudinal groove 93, in which the projection or key of the roller 91 travels. The rod 92 has bearings therefor at its ends and is rotatable by means of pinion 96, meshing with small gear 97, fixed to rod 92. The pinion 96 is provided with a detachable crank-handle 98 or other suitable means for actuating same. When rod 92 is rotated, roller 91 also revolves, and the teeth thereon engaging similar teeth on the exterior of collar 85 cause the latter to rotate, and thus to travel forward, carrying the block 81 with it to its initial position. The pinion 91 is prevented from moving too far backward or forward on rod 92 by the presence of flanges 85$^a$ on collar 85.

Projecting upward from the cross-piece 64 is a standard 99, which provides one of the bearings for the grooved shaft 92, which lies parallel to the lead-screw 16, and also a bearing for the gear-wheel 96.

I show one modification of collar 85, designed for lighter work, where the parts will not be so heavy that they cannot be returned to their starting position by hand. In place of the collar 85, through which the lead-screw passes, I provide a clamp 104, which consists of the pair of castings 105 and 106, pivotally joined below the lead-screw 16 by the pin 107, which passes through perforations in the ears 108. The clamp can be held in engagement with the lead-screw 16 by passing the pin 109 between the projecting fingers 110. When the pin 109 is withdrawn, the two parts 105 and 106 swing apart and out of contact with the lead-screw 16. The yoke 80, block 81, and connected parts can then be moved forward by hand. The threads 111 on the lower part of the clamp are mutilated at 112, so that they do not catch on the threads of the lead-screw when it is desired to move the parts forward. In this modified construction the standard 99, the grooved rod 92, and the rear bearing therefor, the gears 96 and 97, and roller 91 are omitted.

The operation of the machine is as follows: The main frame is anchored to the ground by the stakes passing through or around the sleepers 6. The box 26 is pointed so that it faces the stump to be extracted and is locked in place by the nuts 27$^a$ and 28$^a$, passing through the segments 3 and bottom and top, respectively, of box 26. Chains are passed around neighboring stumps or trees and attached to the link 22 or clevis in place of same, which holds lead-screw 16 through yoke 18, and also clevises 12 are spiked or otherwise attached to the anchoring-stump, and thus by means of the bars 11, connected to the channel-irons 9, further means for anchoring the machine in place is provided. A chain is attached to the stump to be extracted, and the movable end thereof is attached by clevis 88 to the traveling yoke 80, and power can then be applied. The team of horses hitched to the end of the sweep-arm 40 travel in a circle around the machine. As the sweep-arm 40 revolves it carries with it wheel 38, keyed to the shaft 34. The motion thereby imparted to shaft 34 is communicated by beveled gears 44 and 45, shaft 46, and gear 48 to the gear-wheel 49, keyed to lead-screw 16. The lead-screw 16 is thus rotated on its axis, it having no longitudinal motion. As the lead-screw 16 revolves it rotates the collar 85 until the shoulder 94 on the collar 85 strikes the stop 95 on the block 81, which prevents the further rotation of collar 85. The continued rotation of the lead-screw tends to continue the rotation of collar 85; but as same is thus locked it merely slides on lead-screw 16, which causes the block 81 to move with it and to carry along yoke 80, and thus to pull the chain attached to the stump to be extracted.

Having thus described my said invention, what I claim, and desire to secure by Letters Patent, is—

1. In a machine of the character described the combination of a main frame, a supplementary frame within said frame, and a yoke traveling in said supplementary frame.

2. In a machine of the character described, the combination of a main frame, a supplementary frame within said frame, and a yoke traveling in said supplementary frame, the motion of said yoke being caused by a lead-screw rotating in said supplementary frame.

3. In a machine of the character described, the combination of a main frame, a supplementary frame within said frame, and a yoke traveling in said supplementary frame, the motion of said yoke being caused by a lead-screw rotating in said supplementary frame, said lead-screw being actuated by power applied from without the main frame.

4. In a machine of the character described, the combination of a main frame, a supplementary frame within said frame, and a yoke traveling in said supplementary frame, the motion of said yoke being caused by a lead-screw rotating in said supplementary frame, said lead-screw being journaled in a frame movably mounted in said supplementary frame.

5. In a machine of the character described, the combination of a main frame, a supplementary frame within said frame, and a yoke traveling in said supplementary frame, the motion of said yoke being caused by a lead-screw rotating in said supplementary frame, the rotation of said lead-screw being caused by a gear-wheel fitting over same but not rigidly attached thereto.

6. In a machine of the character described, the combination of a main frame, a supplementary frame within said frame, and a yoke traveling in said supplementary frame, the motion of said yoke being caused by a lead-screw rotating in said supplementary frame, the rotation of said lead-screw being caused by a gear-wheel keyed to the lead-screw.

7. In a machine of the character described, the combination of a main frame, a supplementary frame within said frame, and a yoke traveling in said supplementary frame, the motion of said yoke being caused by a lead-screw rotating in said supplementary frame, the rotation of said lead-screw being caused by a gear-wheel, said gear-wheel being held in place by a collar attached to said supplemental frame.

8. In a machine of the character described, the combination of a main frame, a supplementary frame within said frame, and a yoke traveling in said supplementary frame, the motion of said yoke being caused by a lead-screw rotating in said supplementary frame, the rotation of said lead-screw being caused by a gear-wheel, said gear-wheel being held in place by a collar having a flange, said collar being attached to said supplementary frame.

9. In a machine of the character described, the combination of a lead-screw having no longitudinal motion, a collar encircling the same, and a traveling yoke extending longitudinally beyond the end of the lead-screw, which is moved by the collar through which the lead-screw revolves.

10. In a machine of the character described, the combination of a lead-screw, a supplementary frame, a frame within said supplementary frame, and yoke within said frame, the motion of said yoke being produced by the rotation of said lead-screw, and a collar on said shaft adapted to travel on said shaft in agreement with the travels of the yoke.

11. In a machine of the character described, the combination of a supplementary frame, a frame mounted in said supplementary frame, and a lead-screw journaled in said frame.

12. In a machine of the character described, the combination of a supplementary frame, a frame mounted in said supplementary frame, a lead-screw journaled in said frame, and a yoke traveling in said frame.

13. In a machine of the character described, the combination of a supplementary frame, a frame mounted in said supplementary frame, a lead-screw journaled in said frame, and a yoke traveling in said frame, the motion of the yoke being produced by the rotation of the lead-screw.

14. In a machine of the character described, a traveling yoke and a rotating lead-screw, the motion of said yoke being produced by the revolution of said screw.

15. In a machine of the character described, a traveling yoke and a rotating lead-screw, the motion of said yoke being produced by the revolution of said screw, a block and tackle, the fixed end of the rope being attached to the lead-screw and the movable end to the traveling yoke.

16. In a machine of the character described, a main frame, a supplementary frame within said frame, and a lead-screw within said supplementary frame, the same being anchored to suitable objects by anchoring-cables attached to the frame and the lead-screw.

17. The combination of a lead-screw, a gear-wheel encircling the same, and a pin mounted in the gear-wheel passing through an opening in the lead-screw.

18. The combination of a lead-screw, a gear-wheel encircling the same, and a pin mounted in the central opening of the gear-wheel passing through an opening in the lead-screw.

19. The combination of a lead-screw, a gear-wheel encircling the same, and a pin mounted in the central opening of the gear-wheel passing through an opening in the lead-screw, said pin under certain conditions being adapted to allow movement of the lead-screw with relation to same in two directions at right angles to each other.

20. In a machine of the character described, the combination of a lead-screw having a diametric opening therethrough and a gear-wheel to rotate the same, said gear-wheel having a recess in its central opening, a pin located therein, said pin projecting through said diametric opening thereby to actuate the screw.

21. In a machine of the character described, the combination of a main shaft, a wheel to actuate said shaft, said wheel being held in place by a circular plate having guides thereon, a lead-screw, and means intermediate said shaft and said lead-screw by which the revolution of said shaft causes revolution of said screw.

22. In a machine of the character described, the combination of a main shaft, a wheel to actuate said shaft, said wheel being held in place by a circular plate having guides thereon, a traveling yoke, and means intermediate said yoke and said shaft whereby the revolution of said shaft causes travel of said yoke.

23. In a machine of the character described, the combination of a main shaft, a wheel to actuate said shaft, said wheel being held in place by a circular plate having guides thereon, and a stump-extracting screw actuated by revolution of said shaft.

24. In a machine of the character described, the combination of a revolving lead-screw, a swivel-joint to which a clevis is attached, an anchoring-rope being attached to said clevis.

25. In a machine of the character described, the combination of a supplementary frame, a frame within said supplementary frame, a lead-screw, and a traveling yoke within said frame, said frame being actuatable vertically in accordance with the motion of said yoke.

26. In a machine of the character described, the combination of a supplementary frame having arcuate slots and a frame within said supplementary frame having studs fastened thereto projecting through said arcuate slots.

27. In a machine of the character described, the combination of a supplementary frame having arcuate slots, a frame within said supplementary frame having studs fastened thereto projecting through said arcuate slots, and a traveling yoke within said frame.

28. In a machine of the character described, the combination of a supplementary frame having arcuate slots, a frame within said supplementary frame having studs fastened thereto projecting through said arcuate slots, a traveling yoke within said frame, and a lead-screw.

29. In a machine of the character described, the combination of a rotating lead-screw, a block through which the lead-screw passes, a yoke attached to said block, and a collar engaging the lead-screw and traveling thereon, motion of the block and yoke being caused by the traveling of the collar.

30. In a machine of the character described, the combination of a supplementary frame, a lead-screw journaled in said supplementary frame, a gear-wheel mounted on said lead-screw, another gear-wheel, and a collar mounted on said supplementary frame to maintain said gear-wheels in mesh.

31. In a machine of the character described, the combination of a lead-screw, a collar thereon, a block, and a traveling yoke, all mounted in a movable frame.

32. In a machine of the character described, the combination of a sliding block and a traveling yoke attached thereto by U-shaped loops.

33. In a machine of the character described, the combination of a supplementary frame, a vertical shaft, and a horizontal shaft journaled in said supplementary frame, suitable gear-wheels actuated by each, a lead-screw, a gear mounted thereon, one of said first-mentioned gear-wheels meshing therewith and thereby securing the rotation of said lead-screw.

34. In a machine of the character described, the combination of a supplementary frame, a vertical shaft, a horizontal shaft, and a lead-screw journaled in said supplementary frame, the motion of all parts being secured by a sweep-arm attached to said vertical shaft.

35. In a machine of the character described, the combination of a horizontal shaft, a lead-screw, and a traveling yoke, the movement of each being caused by the same main shaft.

36. In a machine of the character described, the combination of a lead-screw, a collar thereon, a block, and a yoke attached thereto, the motion of the yoke being secured by rotation of the lead-screw.

37. In a machine of the character described, the combination of a lead-screw, a collar thereon, a block with a stop thereon, and a yoke attached thereto, the motion of the yoke being secured by rotation of the lead-screw.

38. In a machine of the character described, the combination of a lead-screw, a collar thereon having a shoulder, a block with a stop thereon, and a yoke attached thereto, the motion of the yoke being secured by rotation of the lead-screw when the shoulder on the collar strikes the stop on the block.

39. In a machine of the character described, the combination of a fixed lead-screw, an internally-threaded collar mounted thereon, a pinion, a gear-wheel in engagement therewith, said pinion being mounted on a splined shaft, and a feathered roller externally toothed also mounted on said shaft and in engagement with said collar, the rotation of all said moving parts being produced by said pinion.

40. In a machine of the character described, the combination of a main frame and clevis attached thereto by longitudinally-adjustable connecting devices, anchoring-chains being held by said clevis.

41. In a machine of the character described, the combination of a main frame with an eye thereon, a channel-iron with a hook-like end inserted into said eye, a bar sliding in said channel-iron and adapted to be kept in fixed engagement therewith, and a clevis on the end of said bar, anchoring-chains being linked to said clevis.

42. In a machine of the character described, the combination of a main frame, a supplementary frame within said frame, a lead-screw within said supplementary frame, a swivel-joint on the end of said lead-screw, and a clevis in connection with said swivel-joint, anchoring-chains being held by said clevis.

43. In a machine of the character described, the combination of a main frame, a supplementary frame within said frame, a lead-screw within said supplementary frame, a swivel-joint on the end of said lead-screw, and a clevis attached to said swivel-joint, and an eye on the main frame, a channel-iron with a hook-like end inserted into said eye, a bar sliding in said channel-iron and adapted to be kept in engagement therewith and a clevis on the end of said bar, anchoring-chains being linked to both of said clevises.

44. In a machine of the character described, the combination of a lead-screw, an internally-threaded and externally-toothed collar rotatable therearound, a shaft disposed parallel to said lead-screw, a toothed roller mounted and adapted to slide longitudinally thereon and engaging said collar, the return motion of said collar being secured by the rotation of said shaft.

45. In a machine of the character described, the combination of a lead-screw, an internally-threaded and externally-toothed collar rotatable therearound, said collar having flanges projecting beyond its teeth, a shaft disposed parallel to said lead-screw, a toothed roller mounted and adapted to slide longitudinally thereon and kept in engagement with said collar by the flanges thereof, the motion of said collar being secured by the rotation of said shaft.

46. In a machine of the character described, the combination of a lead-screw, an internally-threaded and externally-toothed collar rotatable therearound, a shaft disposed parallel to said lead-screw, a toothed roller mounted and adapted to slide longitudinally thereon and engaging said collar, the return motion of said collar being secured by the rotation of said shaft, and means to cause the longitudinal travel of said toothed roller to coincide with the longitudinal travel of said collar.

47. In a machine of the character described, the combination of a rectangular frame, a lead-screw journaled therein, a collar mounted on said lead-screw and rotating therearound, and means mounted on said frame adapted to cause the rotation of said collar.

48. In a machine of the character described, the combination of a rectangular frame, a lead-screw journaled therein, a collar mounted on said lead-screw rotating therearound and traveling longitudinally thereon, and means mounted on said frame to cause the rotation and longitudinal movement of said collar.

49. In a machine of the character described, the combination of a main frame, a supplementary frame within said frame, and means for holding said supplementary frame at a fixed position in said frame.

50. In a machine of the character described, the combination of a main frame, a supplementary frame within said frame, and means for holding said supplementary frame at a fixed position in said frame, said means also serving to shift said supplementary frame when desired.

51. In a machine of the character described, the combination of a main frame, a supplementary frame within said frame, and means for holding said supplementary frame at a fixed position in said frame, the same means serving to shift the position of said supplementary frame when desired, said means consisting of cables attached to said supplementary frame and actuated by means fastened on said frame.

52. In a machine of the character described, the combination of a main frame, eyes thereon, sleepers on which said frame is supported, eyes on said sleepers, and means connecting said frame and said sleepers and attached in said eyes.

53. In a machine of the character described, the combination of a main frame, registering eyes on the upper and lower members thereof, a supplementary frame within said frame, and held in place by bolts or rods passing through said eyes.

54. In a machine of the character described, the combination of a main frame, a supplementary frame in connection with said main frame, a movable member in connection with said supplementary frame, and means within said supplementary frame adapted to cause travel of said member.

55. In a machine of the character described, the combination of a main frame, a supplementary frame in connection with said main frame, a movable member in connection with said supplementary frame, and means within said main frame and supplementary frame causing the travel of said movable member when power is applied from without said main frame.

56. In a machine of the character described, the combination of a main frame, a supplementary frame mounted in connection therewith, and means in connection with said supplementry frame adapted to extract the stump when power is applied.

57. In a stump-extractor, the combination of a main frame, a supplementary frame in connection with said main frame, a lead-screw within said supplementary frame, means in connection with said lead-screw to secure rotation of the same, and stump-extracting means actuated by said lead-screw as it rotates.

58. In a stump-extractor, the combination of a main frame, a supplementary frame in connection with said main frame, a lead-screw within said supplementary frame, stump-extracting means actuated by said lead-screw, and means adapted to cause return travel of said stump-extracting means, without actuation of said lead-screw.

59. In a stump-extractor, the combination of a main frame, a supplementary frame in connection with said main frame, and means in connection with said supplementary frame adapted to convert rotary into longitudinal motion.

60. In a stump-extractor, the combination of a main frame, a supplementary frame, a lead-screw within said supplementary frame, and means adapted to cause rotation of said screw by application of power from without said main frame.

61. In a stump-extractor, the combination of a main frame, a supplementary frame, a lead-screw, stump-extracting means actuated by the rotation of said lead-screw, and a stump-extracting block and tackle, the moving end of which is actuated by the traveling part of said stump-extracting means.

62. In a stump-extractor, the combination of a main frame, a supplementary frame in connection with said main frame, a main shaft, a lead-screw within said supplementary frame, said lead-screw being normally disposed at right angles to said shaft, and intermediate means whereby rotation of said shaft causes rotation of said lead-screw.

63. In a stump-extractor, the combination of a main frame, a supplementary frame in connection with said main frame, a main shaft, a lead-screw within said supplementary frame, said lead-screw being normally disposed at right angles to said shaft, and intermediate means whereby rotation of said shaft causes rotation of said lead-screw, said intermediate means being so disposed as to allow radial shifting of said lead-screw while same is rotating.

64. In a stump-extractor, the combination of a lead-screw, a threaded collar thereon, said collar being adapted to rotate therearound, means predeterminedly to hold the collar from rotation, whereby said collar is given longitudinal movement as said screw rotates, and stump-extracting means actuated by said collar during the period of longitudinal movement thereof.

65. In a stump-extractor, the combination of a stationary lead-screw, a threaded collar thereon, stump-extracting means in connection with said collar, and means for causing said collar to rotate about said screw, thereby causing return travel of said stump-extracting means.

66. In a stump-extractor, the combination of a main shaft, a pinion on one end thereof, a lead-screw, a gear-wheel mounted on said lead-screw, a secondary shaft, a gear-wheel on said shaft meshing with and driven by said pinion, and another gear-wheel on said shaft meshing with and driving said gear-wheel on said lead-screw, whereby the rotation of said main shaft causes rotation of said lead-screw.

67. In a machine of the character described, the combination of a lead-screw having a diametric opening therethrough, a gear-wheel to rotate said screw, shouldered recesses in the hub of said gear-wheel, a pin located therein, said pin projecting through said diametric opening, thereby to actuate the screw, and a collar having a boss thereon, said collar serving to hold said pin in place and said boss serving to fill up the recesses in said gear-wheel.

68. In a machine of the character described, the combination of a lead-screw having a diametric opening therethrough, a gear-wheel to rotate said screw, a pin projecting through said diametric opening, and means in connection with said gear-wheel adapted to keep said pin revolubly mounted therein.

69. In a machine of the character described, a longitudinally-traveling yoke, and a rotating lead-screw, said yoke being composed of a plurality of members disposed approximately parallel to said screw, and a transverse cross-connecting member, the travel of said yoke being produced by said screw, and means in connection with said yoke whereby its movement causes extraction of a stump.

70. In a machine of the character described, the combination of a main frame, a supplementary frame slidingly mounted within said main frame, and stump-extracting means mounted in said supplementary frame.

71. In a machine of the character described, the combination of an arcuate main frame and a supplementary frame in connection therewith, said supplementary frame being adapted to be moved in relation to said main frame so as to point in any desired direction within the arc of said main frame.

72. In a machine of the character described, the combination of an arcuate main frame, a supplementary frame in connection therewith, said supplementary frame being adapted to be moved in relation to said main frame so as to point in any desired direction within the arc of said main frame, and means engaging said arcuate frame and said supplementary frame adapted to hold the latter in any desired position.

73. In a machine of the character described, the combination of a main frame, a supplementary frame in connection with said frame, said supplementary frame being so adjustable in position as to allow a plurality of extractions from one anchorage of the main frame.

74. In a machine of the character described, the combination of a main frame, a supplementary frame in connection therewith, another frame in connection with said supplementary frame, and a lead-screw mounted therein, said last-mentioned frame being so mounted as to allow said lead-screw to be movable in a vertical direction.

75. In a machine of the character described, the combination of an arcuate main frame, a supplementary frame in connection therewith, and a lead-screw mounted in said supplementary frame, said frame being adapted to be swung in the arc of a circle limited by said arcuate frame, and its direction changed without alteration of the position of the main frame.

76. In a machine of the character described, the combination of a lead-screw, a block traveling parallel to said screw, and a threaded collar engaging the block and adapted to travel on said screw, the travel of said block being caused by the rotation of said lead-screw.

77. In a machine of the character described, the combination of a lead-screw, a block in connection with the same having a shoulder thereon, a threaded collar engaging the block and the lead-screw and traveling on the latter and with the former, and being provided with a shoulder thereon, the shoulder of said collar locking with the shoulder on said block, by which rotation of said collar is prevented and travel of said collar causes travel of said block.

78. In a stump-extractor, the combination of a lead-screw, a threaded collar thereon, said collar being adapted to rotate therearound, means predeterminedly to hold the collar from rotation, whereby said collar is given longitudinal movement as said screw rotates, and means actuated by said collar causing the extraction of a stump during the period of longitudinal movement thereof, said means being returned to starting position by the rotation of said collar.

79. In a machine of the character described, the combination of a frame and a lead-screw mounted therein, one end of said lead-screw being journaled in bearings provided therefor in said frame, and the other end of said screw being held in a universal joint outside of said frame.

80. In a machine of the character described the combination of a lead-screw, a gear-wheel loosely encircling the same, means intermediate said gear and said screw by which the rotation of the one is conveyed to the other, and means for rotating said gear.

81. In a machine of the character described, the combination of a lead-screw, means for causing the rotation thereof, stump-extracting means actuated as said screw is rotated, and means for returning said stump-extracting means to starting position while said lead-screw remains in fixed position.

82. In a machine of the character described, the combination of a lead-screw, a block through which the lead-screw passes, stump-extracting means secured to said block, an internally-threaded collar mounted on said lead-screw and traveling thereon, motion of the block and stump-extracting means being caused by the traveling of the collar, and means causing said collar to move longitudinally in one direction without rotary motion and in the opposite direction with rotary motion.

83. In a machine of the character described, the combination of a lead-screw, a block through which the lead-screw passes, an opening in said block, an internally-threaded collar mounted on said lead-screw and placed in said opening in said block, motion of said block being caused by the traveling of said collar.

84. In a machine of the character described, the combination of a lead-screw, a block, intersecting apertures in said block, through one of which the lead-screw passes, and an internally-threaded collar mounted on said screw and traveling thereon, said collar being placed in the other of said apertures, the motion of the block being caused by the traveling of the collar.

In testimony whereof I have affixed my signature in presence of two witnesses.

EDWIN T. SHELTON.

Witnesses:
 ELLIOTT R. GOLDSMITH,
 GLADYS WALTON.